(12) United States Patent
Blöcher et al.

(10) Patent No.: US 8,476,854 B2
(45) Date of Patent: Jul. 2, 2013

(54) POWER SUPPLY DEVICE

(75) Inventors: Bernd Blöcher, Erlangen (DE); Marc Hiller, Lauf an der Pegnitz (DE); Rainer Sommer, Heroldsbach (DE)

(73) Assignee: Siemens Aktiengesellschaft, München (DE)

( * ) Notice: Subject to any disclaimer, the term of this patent is extended or adjusted under 35 U.S.C. 154(b) by 274 days.

(21) Appl. No.: 12/991,277

(22) PCT Filed: Mar. 27, 2009

(86) PCT No.: PCT/EP2009/053654
§ 371 (c)(1),
(2), (4) Date: Nov. 5, 2010

(87) PCT Pub. No.: WO2009/135730
PCT Pub. Date: Nov. 12, 2009

(65) Prior Publication Data
US 2011/0089873 A1   Apr. 21, 2011

(30) Foreign Application Priority Data
May 7, 2008   (DE) .................. 10 2008 022 618

(51) Int. Cl.
*H02P 27/06* (2006.01)
*H02P 6/00* (2006.01)
(52) U.S. Cl.
CPC ....................... *H02P 6/001* (2013.01)
USPC ............. 318/400.3; 318/400.01; 318/400.17; 318/400.21; 318/700
(58) Field of Classification Search
CPC ........................................... H02P 6/001
USPC ............... 318/400.3, 400.01, 400.17, 400.21, 318/700
See application file for complete search history.

(56) References Cited

U.S. PATENT DOCUMENTS

| | | | | |
|---|---|---|---|---|
| 5,046,666 A | * | 9/1991 | Ono ................................ | 239/73 |
| 5,050,058 A | * | 9/1991 | April et al. ...................... | 363/65 |

(Continued)

FOREIGN PATENT DOCUMENTS

| | | |
|---|---|---|
| DE | 101 03 031 A1 | 7/2002 |
| EP | 1 316 672 A1 | 6/2003 |

(Continued)

OTHER PUBLICATIONS

R. Marquardt, A. Lesnicar, J. Hildinge: "Modulares Stromrichterkonzept für Netzkupplungsanwendung bei hohen Spannungen" ETG-Conference 2002; Book; 2002.

(Continued)

*Primary Examiner* — Walter Benson
*Assistant Examiner* — David Luo
(74) *Attorney, Agent, or Firm* — Henry M. Feiereisen LLC (57) ABSTRACT

A power supply device for a variable rotation speed drive includes a free-running converter connected to a land-based power grid, and an inverter connected to the variable rotation speed drive. A direct-current cable electrically connects the DC side of the converter with the DC side of the inverter. The inverter includes a plurality of phase modules having an upper and a lower valve branches with least two series-connected, two-pole subsystems with distributed energy storage devices. The inverter is located on the seabed in immediate vicinity of the variable rotation speed drive. Signal electronics of the inverter is located on land. In this way, the distance between the power supply on land and the drive on the ocean floor can reach several hundred kilometers, with ocean depths of several kilometers.

10 Claims, 5 Drawing Sheets

U.S. PATENT DOCUMENTS

| | | | |
|---|---|---|---|
| 5,920,467 A * | 7/1999 | Bowyer et al. | 363/37 |
| 6,519,169 B1 * | 2/2003 | Asplund et al. | 363/132 |
| 7,737,652 B2 * | 6/2010 | Schwesig | 318/432 |
| 7,835,166 B2 * | 11/2010 | Hiller | 363/132 |
| 2008/0203734 A1 * | 8/2008 | Grimes et al. | 290/40 R |

FOREIGN PATENT DOCUMENTS

| | | |
|---|---|---|
| EP | 1 385 259 A2 | 1/2004 |
| RU | 2137945 C1 | 9/1999 |
| RU | 28743 U1 | 4/2003 |
| WO | WO 2007/028349 A1 | 3/2007 |
| WO | WO 2007/086722 A1 | 8/2007 |

OTHER PUBLICATIONS

M. Beuermann, M. Hiller, R. Sommer: "Stromrichterschaltungen für Mittelspannung und deren Leistungshalbleiter für den Einsatz in Industriestromrichtem" ETG-Conference 2006, Bad Nauheim; Others; 2006.

Sverre Gilje, Lars Carlsson: "Calhall re-development project, power from shore" ENERGEX 2006; Others.

Lamell J O et al: "Offshore Platform Powered with New Electrical Motor Drive System", USA Sep. 12-14, 2005, pp. 259-266.

* cited by examiner

POWER SUPPLY DEVICE

CROSS-REFERENCES TO RELATED APPLICATIONS

This application is the U.S. National Stage of International Application No. PCT/EP2009/053654, filed Mar. 27, 2009, which designated the United States and has been published as International Publication No. WO 2009/135730, and which claims the priority of German Patent Application, Serial No. 10 2008 022 618.1, filed May 7, 2008, pursuant to 35 U.S.C. 119(a)-(d).

BACKGROUND OF THE INVENTION

The invention relates to a power supply device for a variable rotation speed drive which is arranged on the seabed.

Variable rotation speed drives, consisting of an electric motor and a pump or a compressor, are supplied by means of a power supply device such as this, when on the seabed, with power from an electrical power supply system on land. The distance between the feeder on land and the drive on the seabed may be several hundred kilometers, at sea depths of several kilometers.

Variable rotation speed drives for underwater applications, also referred to as subsea applications, are used, for example, for delivering oil and gas from the seabed. These variable rotation speed drives are, as is known, supplied with power from an electrical power supply system by means of a voltage intermediate-circuit converter.

The publication entitled "Stromrichterschaltungen für Mittelspannung und deren Leistungshalbleiter für den Einsatz in lndustriestromrichtern" [Power converter circuits for medium voltage and their power semiconductors for use in industrial power converters] by Max Beuermann, Marc Hiller and Dr. Rainer Sommer, printed in the Proceedings of the ETG Conference "Bauelemente der Leistungselektronik und ihre Anwendung" [Power electronics components and their use], Bad Nauheim, 2006, discloses a plurality of converter topologies for implementation of medium-voltage converters. These converter topologies include 3-level neutral-point clamped (3L-NPC) converters with a 12-pulse diode feed, a 4-level flying capacitor (4L-FC) with a 12-pulse diode feed, series-connected H-bridge cell converters with 2-level H-bridges per cell (SC-HB(2L)) and a series-connected H-bridge cell converter with one 3-level H-bridge per cell (SC-HB(3L)).

The publication "Modulares Stromrichterkonzept für Netzkupplungsanwendung bei hohen Spannungen" [Modular converter concept for power supply system coupling use at high voltages], by Rainer Marquardt, Anton Lesnicar and Jürgen Hildinger, printed in the Proceedings of the ETG Conference 2002, discloses a converter with a power converter on the power supply system side and on the load side, which are electrically conductively connected to one another on the DC voltage side, wherein a modular multipin power converter, also referred to as a modular multilevel converter (M2C), in each case being used as the power converter. A voltage intermediate-circuit converter such as this with a power converter on the power supply system side and on the load side, based on M2C topology, no longer has a voltage intermediate circuit, formed from intermediate-circuit capacitors, in comparison to the already described voltage intermediate-circuit converters. Each valve branch in each phase module of the converter based on M2C topology has at least one two-pole subsystem. The steps in a phase output voltage are governed by the number of subsystems used in each valve branch.

Figure 1:
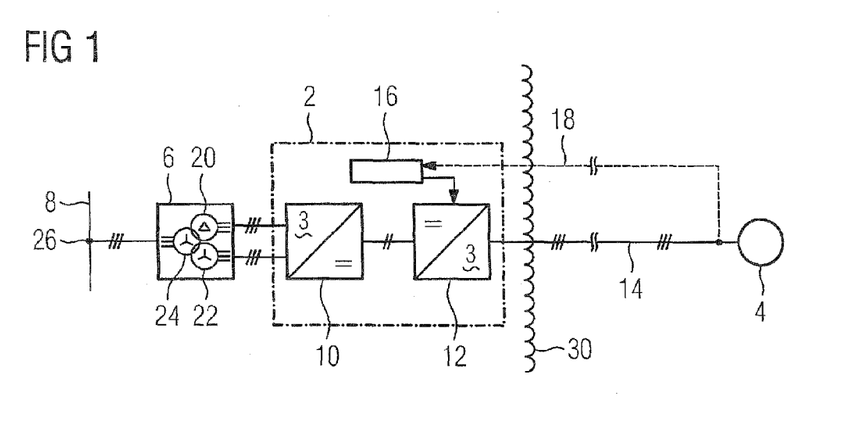
FIGS. 1-4 show known variants of a power supply device for variable rotation speed drives for subsea applications.

The object of a power supply device for subsea applications is to supply a motor, which is located on the seabed, for a variable rotation speed drive, with a polyphase voltage system with a variable voltage and frequency. There are various fundamental embodiments in this case:

FIG. 1 schematically illustrates a first known variant of a power supply device for subsea applications. In this FIG. 1, 2 denotes a voltage intermediate-circuit converter, 4 an electric motor for a drive, 6 a power converter transformer and 8 a feeding power supply system. The voltage intermediate-circuit converter 2 has a power converter 10 and 12 on the power supply system side and on the load side, which are electrically connected to one another on the DC voltage side by means of a DC voltage intermediate circuit, which is not shown explicitly, for clarity reasons. The power converter on the load side, which is preferably a self-commutated pulse-controlled power converter, is linked to the motor 4 by means of a three-phase alternating-current cable 14. In addition, this converter 2 has signal electronics 16, which can be connected on the input side by means of a data line 18 to connections of the electric motor 4, and this data cable 18 is therefore shown by means of a dashed line, and is connected on the output side to control connections of the self-commutated pulse-controlled power converter 12. A transformer with two secondary windings 20 and 22 is provided as a power converter transformer 6, of which windings the secondary winding 20 is connected in delta, and the secondary winding 22 is connected in star. Since the primary winding 24 is likewise connected in star, only the secondary winding 20 has a phase-shift angle with respect to the primary winding 24 of 30° electrical. The primary winding 24 is electrically conductively connected to the feeding power supply system 8, in particular to a feed point 26. A 12-pulse diode feed is provided as the power converter 10 on the power supply system side. This means that this diode feed 10 has two three-phase diode bridges, which are electrically connected in series on the DC voltage side. The 12-pulse embodiment of the diode feed 10 results in the current overshoots in the feeding power supply system 8 being small. This power supply device for subsea applications is arranged on land, or on a platform at sea. The transition from the land or platform to the sea is indicated by the wavy lines 30. Therefore, only the drive, consisting of the motor 4 and a pump and/or a compressor, is located on the seabed. Of the drive, only the motor 4 is shown in any detail.

Since the capacitive charging power of the alternating-current cable 14 places a major requirement for reactive power on the voltage intermediate-circuit converter 2, there can be only a limited distance between the converter 2 and the motor 4. In addition, this power supply device does not allow a multiple-motor drive. Each motor 4 in a drive must be connected by means of its own alternating-current cable 14 to the voltage intermediate-circuit converter 2.

Figure 2:
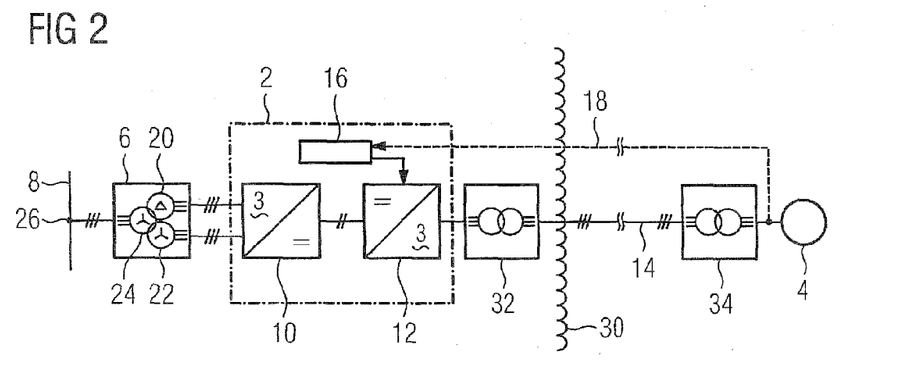

FIG. 2 shows a further known power supply device for a variable rotation speed drive which is arranged on the seabed. This embodiment differs from the embodiment shown in FIG. 1 in that the alternating-current cable 14 is linked by means of a transformer 32 to outputs of the self-commutated pulse-controlled power converter 12 in the voltage intermediate-circuit converter 2. In addition, this alternating-current cable 14 is connected by means of a second transformer 34 to connections of the electric motor 14 which is arranged on the seabed. The transformer 32 transforms a generated converter voltage to a potential which is higher than the potential of the rated voltage of the electric motor 4. After transmission, this potential is transformed back to the rated potential of the motor. The increased transmission voltage results in reduced resistive power losses. In addition, the alternating-current cable 14 may have a smaller cable cross section, thus allowing a better design of the cable 14. This makes it possible to bridge a greater distance between the converter 2 and the motor 4, in comparison to the embodiment shown in FIG. 1. These advantages are countered by the need for two transformers 32 and 34, and the transformer 34 on the seabed must be encapsulated. When supplying power to a plurality of motors 4 on the seabed, two further transformers 32, 34 must also be provided for each further motor 4, as well as a further cable 14.

Figure 3:
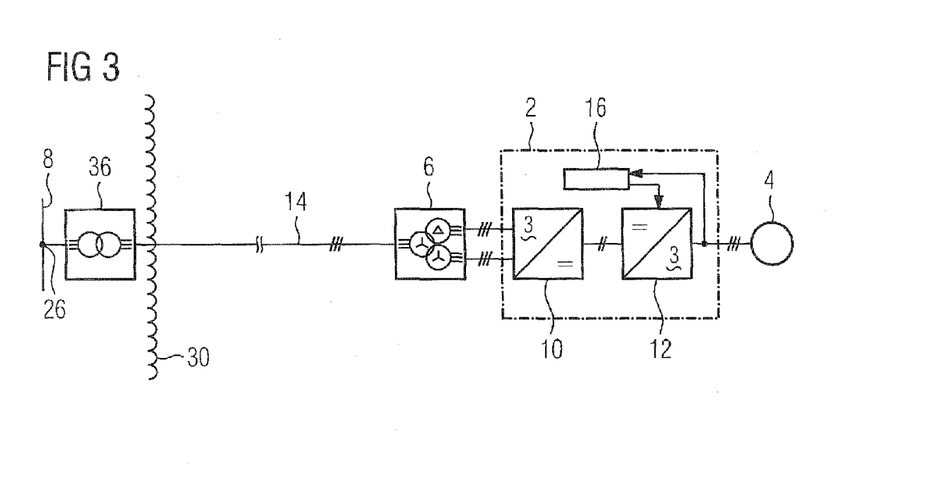

In a further variant of the power supply device for a variable rotation speed drive on the seabed, the voltage intermediate-circuit converter 2 is arranged with the power converter transformer 6 on the power supply system side, as shown in FIG. 3, on the seabed in the immediate vicinity of the electric motor 4 for the variable rotation speed drive. A power supply system transformer 36 is provided on land, whose primary is electrically conductively connected to the feeding power supply system 8, in particular to the feed point 26, and whose secondary is electrically conductively connected to the alternating-current cable 14. The use of the power supply system transformer 36 allows the AC voltage to be transmitted to be transformed to a value which is above the potential of the rated voltage of the electric motor 4. This transmission voltage is transformed down again by the power converter transformer 6.

In this power supply device, only the transformer 36 is still located on land or on a platform arranged at sea. The voltage intermediate-circuit converter 2 is now located adjacent to the motor 4 on the seabed, and can be directly linked to the motor 4. This improves the drive performance, although the converter 2 now also has to be encapsulated. In comparison to the variant of the power supply device shown in FIG. 2, this changes nothing with regard to the distance between the feed point 26 and the motor 4.

Figure 4:
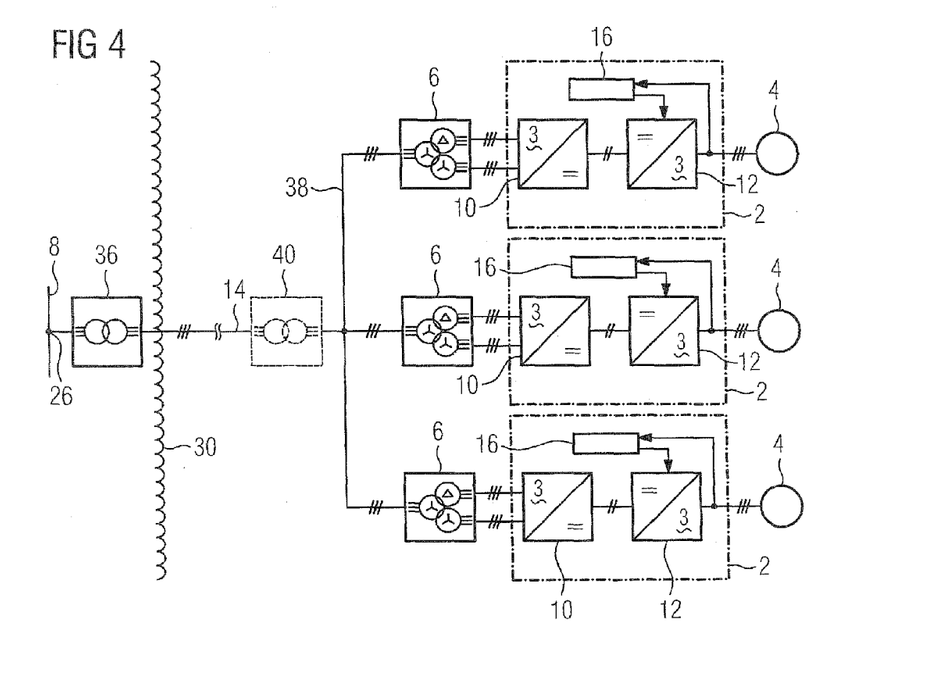

FIG. 4 schematically illustrates a multiple-motor variant of the power supply device shown in FIG. 4. Each motor for a variable rotation speed drive is coupled to a voltage intermediate-circuit converter 2 by means of a power converter transformer 6 on the power supply system side. On the seabed, the alternating-current cable 14 is linked to an alternating-current busbar 38, to which the plurality of power-converter-fed drives are connected. The alternating-current cable 14 can be provided with a further transformer 40 on the load side on the seabed, whose secondary is linked to the alternating-current busbar 38. Since this further transformer 40 is not absolutely essential, it is illustrated by means of dashed lines. This further transformer 40 results in the AC voltage busbar 38 being at a potential below the potential of the transmission voltage, but above the potential of the rated voltage of the electric motor 4 for a variable rotation speed drive. In this variant as well, the distance between the feed point 26 on land and the drive on the seabed is still restricted, as in the case of the other variants shown in FIGS. 1 to 3. Furthermore, the number of installation parts on the seabed has increased many times. All the installation parts which are arranged on the seabed must be accommodated in an encapsulated form, in particular in each case in a pressure vessel.

The publication "Valhall Re-Development Project, Power from Shore" by Sverre Gilje and Lars Carlsson, printed in "ENERGEX 2006", discloses a power supply device which connects a platform at sea to a feed point on land. The known "light" version of the high-voltage, direct-current transmission installation is provided as the power supply device. This HVDC light has two self-commutated pulse-controlled power converters, which are connected to one another on the DC voltage side by means of a direct-current cable. Each of these two self-commutated pulse-controlled power converters has an alternating-current filter on the AC voltage side, and a capacitor and a direct-current filter on the DC voltage side. The one self-commutated pulse-controlled power converter is arranged by means of a power supply system transformer at a feed point of a feeding power supply system on land while, in contrast, the second self-commutated pulse-controlled power converter is arranged on a platform at sea. A sea cable with a length of approximately 300 km is provided as the DC voltage cable. No communication is required between these two power converters. All that is required is the value of the DC voltage at both ends of the DC voltage cable. The power converter station on land controls the transmission voltage, and the power converter station on the platform at sea controls the real power. The distance between the feed point and the platform is likewise restricted with this power supply device, as well.

The invention is now based on the object of developing the known power supply device such that the distance between the feed point on land and the drive on the seabed is considerably greater.

SUMMARY OF THE INVENTION

This object is achieved according to the invention with a power supply device for a variable rotation speed drive arranged on the seabed, which includes a free-running converter connected on an AC side to a power grid located on land, an inverter having a DC side connected to a DC side of the converter and a load side connected to the variable rotation speed drive, the inverter including a plurality of phase modules, with each phase module having an upper and a lower valve branch and each valve branch having at least two series-connected, two-pole subsystems with distributed energy storage devices, the inverter being located on the seabed in immediate vicinity of the variable rotation speed drive, a direct-current cable electrically connecting the DC side of the converter with the DC side of the inverter, and land-based signal electronics of the inverter.

Since a power converter with distributed energy stores is provided as the self-commutated power converter, on the load side, of the power supply device, the upper and lower valve branch of which power converter in each phase module has at least two two-pole subsystems which are electrically connected in series, the power supply device according to the invention no longer has an energy store in the DC voltage intermediate circuit, as a result of which the direct-current cable which electrically conductively connects the power converter on the power supply system side and the power converter on the load side of the power supply device according to the invention can bridge considerably greater distances. This allows the power converter with distributed energy stores in the power supply device according to the invention to be arranged adjacent to the motor being fed on the seabed and its converter on the power supply system side on land.

Because of the design of the intermediate circuit, which does not necessarily have a lower inductance, and because of the lack of the intermediate-circuit capacitor, an intermediate-circuit short is highly improbable in comparison to the situation in a voltage intermediate-circuit converter with an intermediate-circuit capacitor. The power converter valves in the power converter on the power supply system side of the power supply device according to the invention therefore need no longer be designed for a short-circuit current caused by a low-impedance intermediate-circuit short. Furthermore, the $i^2t$ arrangement of these power converter valves can be considerably reduced.

The use of a power converter having a multiplicity of two-pole subsystems as a power converter on the load side of the power supply device allows the voltage intermediate-circuit converter to be split between the land and the seabed. Only the load-side power converter with distributed energy stores of this power supply device is therefore still located on the seabed. Since the value of the converter output voltage, and therefore of the motor voltage, is governed by the number of two-pole subsystems for each valve branch in a phase module of the load-side power converter with distributed energy stores, there is no longer any need for a transformer on the seabed.

Furthermore, the finely graduated output voltage form of the load-side power converter with distributed energy stores for the power supply device according to the invention makes it possible to use motors that are suitable for under-water use with less stringent requirements for the winding insulation. Since a high motor voltage can nevertheless be set independently of the use of a transformer, connecting lines and bushings to the motor can be designed for lower currents. In addition, this makes it possible to avoid the need for motors with a plurality of winding systems for relatively high power levels.

Since the load-side power converter with distributed energy stores in the power supply device consists only of a number of two-pole subsystems, which are electrically connected in series, for each valve branch, the availability of the power supply device can be considerably improved by adding redundant two-pole subsystems.

In addition to the power converter on the power supply system side of the power supply device according to the invention, signal electronics for the load-side power converter, which is arranged on the seabed, with distributed energy stores are also arranged on land. These signal electronics are connected for signaling purposes by means of a data cable to control inputs of the load-side power converter with distributed energy stores on the seabed. Major components of the power supply device according to the invention are therefore accommodated on land or on a platform, thus considerably reducing the complexity for encapsulation of the components of the power supply device according to the invention.

In one advantageous embodiment of the power supply device according to the invention, the uncontrolled power converter on the power supply system side is electrically conductively connected by means of the direct-current cable to a DC voltage busbar which is arranged on the seabed. This DC voltage busbar can be connected to a multiplicity of load-side power converters with distributed energy stores, in each case with a motor on the output side, for a variable rotation speed drive. A power supply device according to the invention can therefore be produced at low cost for a multiple-motor drive.

BRIEF DESCRIPTION OF THE DRAWING

In order to explain the invention further, reference is made to the drawing, which schematically illustrates a plurality of embodiments of a power supply device according to the invention.

DETAILED DESCRIPTION OF PREFERRED EMBODIMENTS

Figure 5:
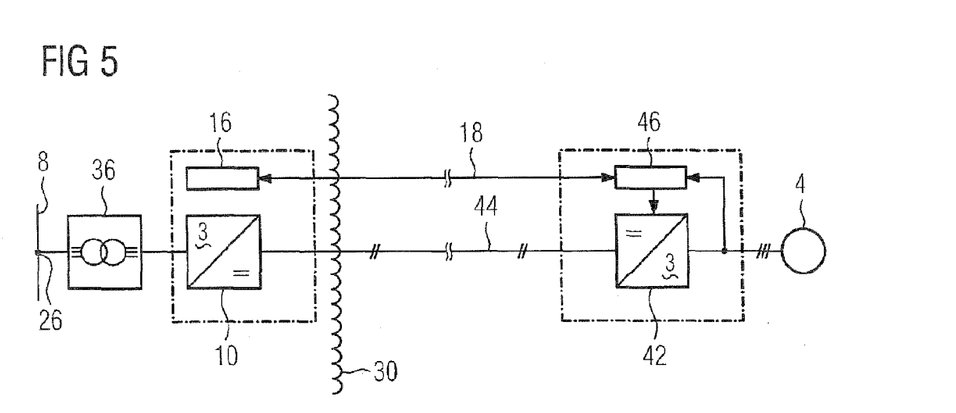
FIG. 5 shows a first variant of a power supply device according to the invention.

FIG. 5 schematically illustrates a first variant of the power supply device according to the invention. In this figure, 42 denotes a load-side power converter with distributed energy stores, 44 denotes a direct-current cable, and 46 denotes a control unit. The power converter 10 on the power supply system side and the power converter 42 on the load side are linked to one another on the DC voltage side by means of the direct-current cable 44. The control unit 46 of this load-side power converter 42 with distributed energy stores is connected by means of a data cable 18 to the signal electronics 16 in the power supply device, which is associated with the power converter 10 on the power supply system side. The power converter 10 on the power supply system side, which is in the form of an uncontrolled power converter, is linked on the AC voltage side by means of the power supply system transformer 36 to the feed point 26 of the feeding power supply system 8. In the power supply device according to the invention, only the load-side power converter 42 with distributed energy stores is arranged on the seabed. All the other installation parts of this power supply device are arranged on land. The transition from land to sea is likewise indicated in this figure by a wavy line 30. A diode feed is provided as the power converter 10 on the power supply system side and, in the simplest case, is in the form of a 6-pulse feed. If the aim is, as far as possible, for there to be no current harmonics in the power supply system, and if then only with a small amplitude, then the diode feed 10 must be designed, for example, as a 12-pulse, 18-pulse or 24-pulse feed.

Figure 6:
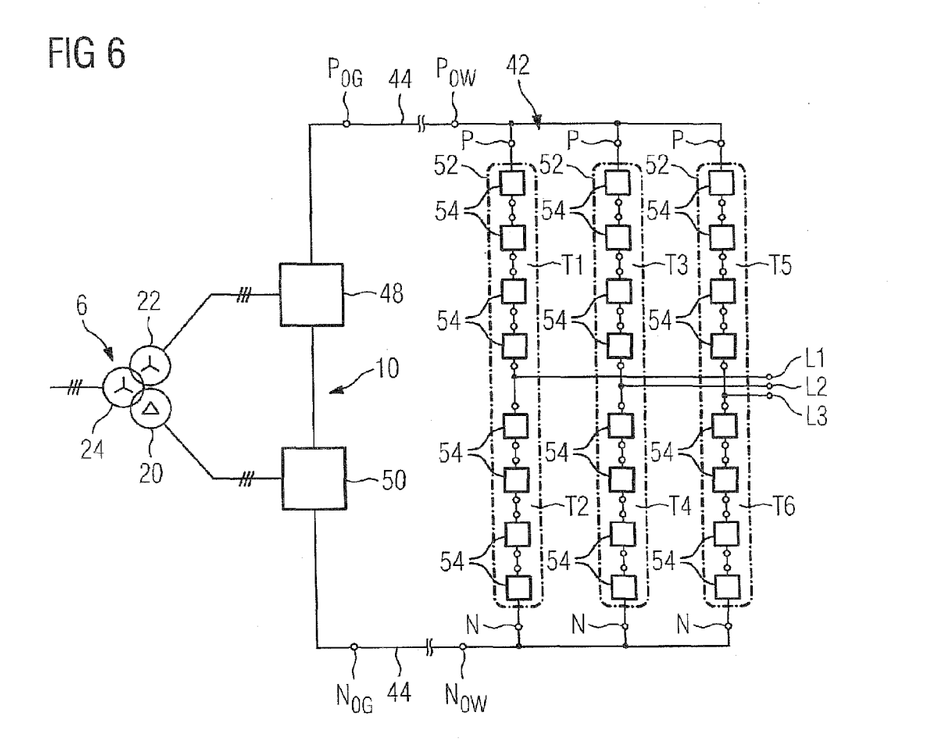
FIG. 6 shows a block diagram of one advantageous embodiment of a power supply device according to the invention.

FIG. 6 shows a block diagram of one advantageous embodiment of the power supply device according to the invention, in schematic form. According to this block diagram, the diode feed 10 has two 6-pulse diode bridges 48 and 50, which are each connected on the AC voltage side to a secondary winding 22 and 20 of the power converter transformer 6, and are electrically connected in series on the DC voltage side. The load-side power converter 42 with distributed energy stores has a plurality of phase modules 52, which are electrically connected in parallel on the DC voltage side. A positive and a negative DC voltage busbar $P_{OW}$ and $N_{OW}$ are provided for the parallel connection of these phase modules 52. A DC voltage, which is not annotated in any more detail, is dropped between these two DC voltage busbars $P_{OW}$ and $N_{OW}$. Each phase module 52 has an upper and a lower valve branch T1, T2; T3, T4 and T5, T6. Each valve branch T1, . . . , T6 has at least two two-pole subsystems 54.

Figure 7:
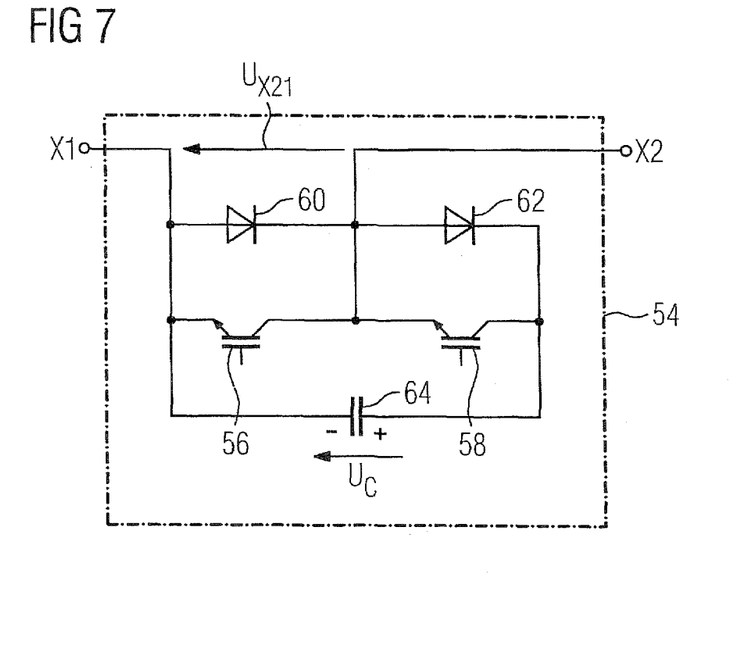
FIGS. 7, 8 show embodiments of in each case one two-pole subsystem of the load-side power converter for the power supply device as shown in FIG. 6.
Figure 8:
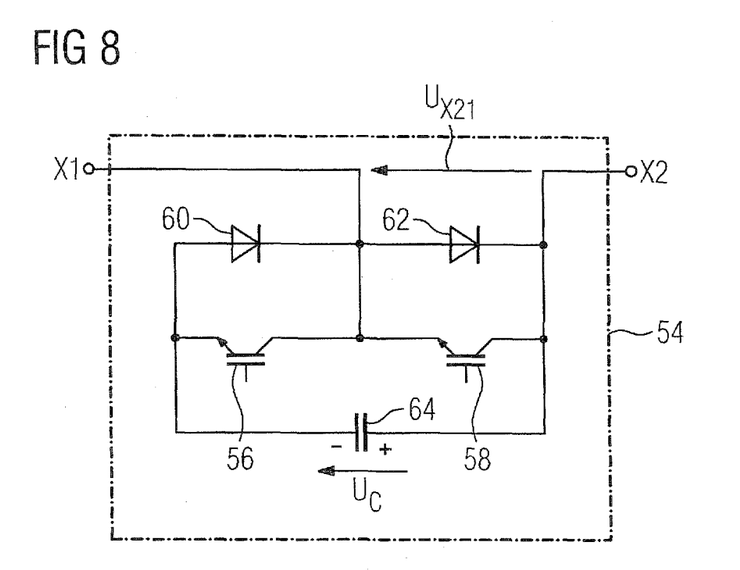

In the illustrated embodiment, each valve branch has four two-pole subsystems 54. The two-pole subsystems 54 are electrically connected in series. Exemplary embodiments of these two-pole subsystems 54 are illustrated in FIGS. 7 and 8. Each junction point between two valve branches T1, T2; T3, T4 and T5, T6 forms a respective connection L1, L2 or L3 on the AC voltage side. The electric motor 4, which is shown in FIG. 5, is connected to these connections L1, L2 and L3 on the AC voltage side. The DC voltage busbars $P_{OW}$ and $N_{OW}$ of the load-side power converter 42 with distributed energy stores and the DC voltage busbars $P_{OG}$ and $NP_{OG}$ of the power converter on the power supply system side are electrically conductively connected to one another by means of the direct-current cable 44.

FIG. 7 shows a first embodiment of a two-pole subsystem 54. This two-pole subsystem 54 has two semiconductor switches 56 and 58 which can be turned off, two diodes 60 and 62 and a unipolar energy storage capacitor 64. The two semiconductor switches 56 and 58 which can be turned off are electrically connected in series, with this series circuit being electrically connected in parallel with the energy storage capacitor 64. One of the two diodes 60 and 62 is electrically connected in parallel with each semiconductor switch 56 and 58 which can be turned off, such that this diode is connected back-to-back in parallel with the corresponding semiconductor switch 56 and 58 which can be turned off. The unipolar energy storage capacitor 64 in the two-pole subsystem 54 consists either of a capacitor or of a capacitor bank comprising a plurality of such capacitors, with a resultant capacitance $C_0$. The junction point between the emitter of the semiconductor switch 56 which can be turned off and the anode of the diode 60 forms a connecting terminal X1 of the subsystem 54. The junction point between the two semiconductor switches 56 and 58 which can be turned off and the two diodes 60 and 62 forms a second connecting terminal X2 of the two-pole subsystem 54.

In the embodiment of the subsystem 54 shown in FIG. 8, this junction point forms the first connecting terminal X1. The junction point between the drain of the semiconductor switch 58 which can be turned off and the cathode of the diode 62 forms the second connecting terminal X2 of the two-pole subsystem 54.

According to the publication cited initially, entitled "Modulares Stromrichterkonzept für Netzkupplungsanwendung bei hohen Spannungen" [Modular power converter concept for power supply system coupling use at high voltages], the two-pole subsystem 54 may assume three switching states. In the switching state I, the semiconductor switch 56 which can be turned off is switched on, and the semiconductor switch 58 which can be turned off is switched off. In this switching state I, the terminal voltage $U_{X21}$ of the two-pole subsystem 54 is equal to 0. In the switching state II, the semiconductor switch 56 which can be turned off is switched off, and the semiconductor switch 58 which can be turned off is switched on. In this switching state II, the terminal voltage $U_{X21}$ of the two-pole subsystem 54 is equal to the voltage $U_C$ across the energy storage capacitor 64. During normal, fault-free operation, only these two switching states I and II are used. Both semiconductor switches 56 and 58 which can be turned off are switched off in the switching state III.

Figure 9:
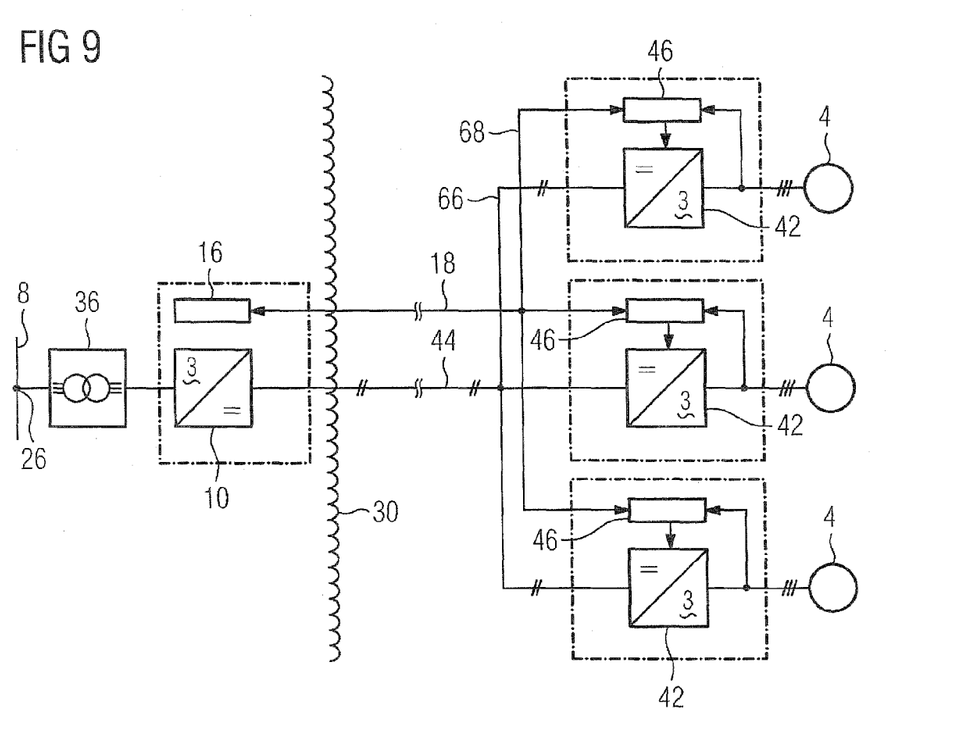
FIG. 9 shows a second variant of a power supply device according to the invention, illustrated in schematic form.

FIG. 9 schematically illustrates a second variant of the power supply device according to the invention. This second variant differs from the variant shown in FIG. 5 by the provision of a DC voltage busbar 66. Three load-side power converters 42 with distributed energy stores, and each with a load-side motor 4 for a variable rotation speed drive, are connected to this DC voltage busbar 66. This DC voltage busbar 66 is linked by means of the direct-current cable 44 to the DC voltage connections of the power converter 10 on the power supply system side. In addition, a data busbar 68 is provided, to which, on the one hand, the control units 46 of the load-side power converters 42 with distributed energy stores, and on the other hand the data cable 18, are connected. The signal electronics 16, which are accommodated on land, for the power supply device according to the invention are therefore each connected for signaling purposes to a control unit 46 of a respective load-side power converter 42, which is arranged on the seabed, with distributed energy stores. The use of a DC voltage busbar 66 reduces the cable costs for a multiple-motor drive, and reduces the installation effort.

This power supply device according to the invention allows power to be supplied from a feeding power supply system to variable rotation speed drives for subsea applications, for example oil and gas delivery installations, in which case the distance between the feed on land and the drive on the seabed may be several hundred kilometers at sea depths of several kilometers.

The invention claimed is:

1. A power supply device for a variable rotation speed drive arranged on the seabed, comprising:
a free-running converter connected on an AC side to a power grid located on land,
an inverter having a DC side connected to a DC side of the converter and a load side connected to the variable rotation speed drive, the inverter comprising a plurality of phase modules, with each phase module having an upper and a lower valve branch and each valve branch having at least two series-connected, two-pole subsystems with distributed energy storage devices, the inverter being located on the seabed in immediate vicinity of the variable rotation speed drive,
a direct-current cable electrically conductively connecting the DC side of the converter with the DC side of the inverter, and
signal electronics of the inverter located on land,
wherein a two-pole subsystem comprises an energy storage capacitor and two turn-off semiconductor switches electrically connected in series at a junction point forming a first connecting terminal of the two-pole subsystem, with the series-connected semiconductor switches being connected electrically in parallel with the energy storage capacitor and a pole of the energy storage capacitor forming a second connecting terminal of the two-pole subsystem.

2. The power supply device of claim 1, comprising at least one self-commutated inverter connected with a corresponding variable rotation speed drive, wherein the DC side of the free-running converter is electrically conductively connected by the direct-current cable to a DC voltage busbar arranged on the seabed, and wherein the DC side of the at least one self-commutated inverter is also connected to the DC voltage busbar.

3. The power supply device of claim 1, wherein the free-running converter is arranged on a platform located at sea.

4. The power supply device of claim 1, wherein the free-running converter comprises a diode rectifier.

5. The power supply device of claim 4, wherein the diode rectifier is a 12-pulse rectifier.

6. The power supply device of claim 4, wherein the diode rectifier is an 18-pulse rectifier.

7. The power supply device of claim 4, wherein the diode rectifier is a 24-pulse rectifier.

8. The power supply device of claim 1, wherein the turn-off semiconductor switches comprise insulated gate bipolar transistors.

9. The power supply device of claim 1, wherein the variable rotation speed drive comprises an electric motor having a rotor, and wherein a pump is connected to the rotor.

10. The power supply device of claim 1, wherein the variable rotation speed drive comprises an electric motor having a rotor, and wherein a compressor is connected to the rotor.

* * * * *